July 8, 1947. H. H. GRIMM 2,423,447
HIGH FREQUENCY AMMETER AND POWER METER
Filed Jan. 30, 1945 2 Sheets-Sheet 1

INVENTOR.
HENRY H. GRIMM
BY William D. Hall.
ATTORNEY

July 8, 1947.                H. H. GRIMM                2,423,447
              HIGH FREQUENCY AMMETER AND POWER METER
                  Filed Jan. 30, 1945        2 Sheets-Sheet 2

INVENTOR.
HENRY H. GRIMM
BY William D. Hall,
ATTORNEY

Patented July 8, 1947

2,423,447

UNITED STATES PATENT OFFICE 2,423,447

HIGH-FREQUENCY AMMETER AND POWER METER

Henry H. Grimm, Dayton, Ohio, assignor to the United States of America, as represented by the Secretary of War Application January 30, 1945, Serial No. 575,319

6 Claims. (Cl. 171—95)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical measuring devices and more particularly to a high frequency ammeter and power meter.

The objects of the present invention comprise the provision of an improved electrical energy measuring device that provides readings of the amperage and wattage of high frequency electrical energy; such a measuring device that is less sensitive to frequency changes than previously existing high frequency ammeters; and a current measuring device which presents small discontinuities in distributed impedances in its introduction into a transmission line system.

With the above and other objects in view which will be apparent to those who are informed in the field of electrical measuring instruments from the following description, suitable embodiments of the present invention are illustrated in the accompanying drawings wherein.

Figure 1:
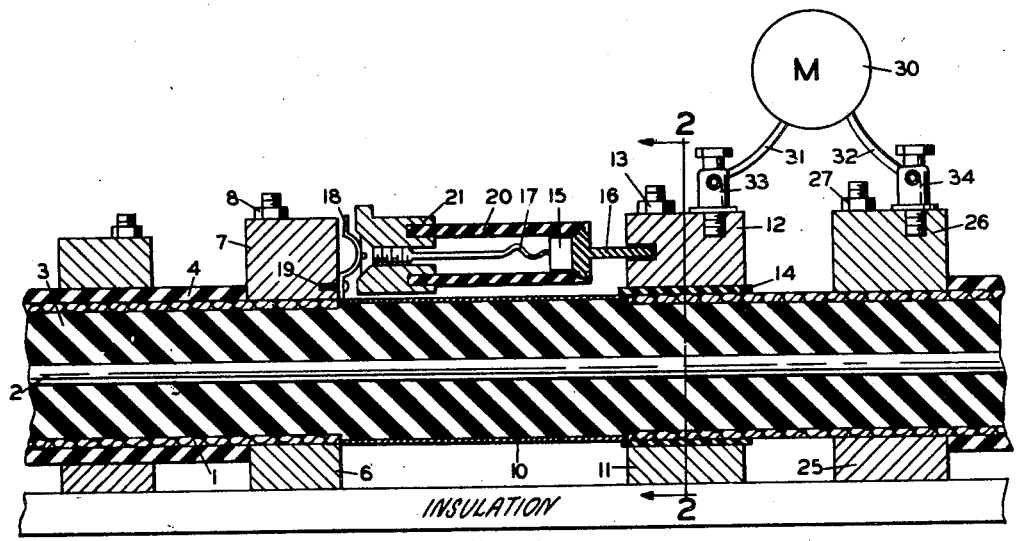
Figure 1 is a fragmentary longitudinal sectional view of a coaxial line assembly and meter that collectively comprise an embodiment of the present invention.

The high frequency crystal rectifier ammeter shown in Figure 1 is connected to a high frequency coaxial line having outer conductor 1 and inner conductor 2. The ammeter measures the current in the outer conductor 1. The coaxial line is connected to an electrical generator not shown and is terminated in its characteristic impedance. The inner conductor 2 is substantially coaxial with and extends longitudinally substantially centrally of the outer conductor 1 with an insulating material 3 interposed therebetween and an insulating coating 4 of rubber or the like protectively disposed radially outwardly of the woven wire outer conductor 1. In the present device the outer insulation 4 is removed from a section of the coaxial cable to expose a portion of the woven wire outer conductor 1 for making desired contacts therewith.

One of such contacts comprises a lower, cable supporting portion 6 and an upper portion 7 that are clamped together in any desired manner, as by bolts 8 or the like, to provide electrical connection with the woven wire outer conductor 1 of the coaxial cable. One section of the woven wire outer conductor 1 is removed to interrupt the electrical continuity thereof and is replaced by a suitable material of greater resistivity, such as a layer 10 of silver paint or the like, that is in electrical connection at both of its ends with the outer conductor 1.

Another clamp comprising a cable supporting portion 11 and an upper portion 12 are secured together by bolts 13 and are insulated from both the outer conductor 1 and from the coating of silver paint 10 by suitable means, such as by mica 14 or the like.

A direct current rectifier of a preferred type, such as a crystal 15 or the like, is interposed between the outer conductor contacting clamp portion 7 and the clamp portion 12 to shunt around the silver paint 10 a smaller portion of the current that flows through the outer conductor 1 than that portion of the current that flows through the silver paint 10. The rectifier that is shown is of a commonly used crystal type that comprises a pin 16 that has its tip seated within a depression in the clamp portion 12 and its head portion against the crystal 15 to maintain electrical connection therebetween. A cat's whisker 17 is interposed between the crystal 15 and the outer conductor contacting clamp portion 7 by having its tip in engagement with the crystal 15 and its slotted head portion in engagement with a spring 18 that is pinned to the clamp 7 by the pin 19.

A head of the pin 16 is embedded within one end of a hollow cylindrical insulating case 20. The case 20, remote from the pin 16, seats in a hollow cap portion 21 that is threaded internally to receive a threaded end of the cat's whisker 17 as shown.

Another connection with the outer conductor 1 and insulated from the clamp upper portion 12 is provided, as by a clamp lower cable supporting portion 25 and clamp upper portion 26 that are secured together in electrical connection with the outer connector 1 by bolts 27 or the like.

A suitable meter 30 such as a micro ammeter or the like, has its two terminal leads 31 and 32 connected in any desired manner, as by connectors 33 and 34 to the clamp upper portions 12 and 26 respectively.

In operation, the current flowing through the outer conductor 1 sets up a potential difference between the clamp 7 and the clamp 12. As previously stated, more of the current flow passes through the layer of silver paint 10 than is rectified and is passed through the crystal 15. The clamp that comprises the lower portion 11 and the upper portion 12 is insulated from the outer conductor 1 by the mica 14 and acts as a by-pass condenser that arrests the flow of direct current and that bypasses radio frequency current. The radio frequency current passes through this condenser and flows back to the cable outer conductor 1. The condenser also serves to prevent radio frequency current from entering the leads 31 and 32 to the meter 30. Additional chokes and condensers can be used to further reduce the amount of radio frequency current in the meter leads 31 and 32, if desired.

The described device provides a current measuring instrument that presents small discontinuities in its introduction into a transmission line system wherein the coaxial cable shown forms a part. The diameter ratios of the transmission line or coaxial cable comprising the outer conductor 1 and inner conductor 2 preferably are uniform throughout. The only discontinuity is in distributed resistance. The distributed resistance in either the outer conductor 1 or the inner conductor 2 is increased markedly for approximately a one inch length to give a radio frequency potential drop that is sufficiently large to operate sensitive radio frequency current instruments. Crystals, bolometer fuses, or hot wire thermocouples may, if preferred, be used as radio frequency sensitive elements also. Crystals are to be preferred where the device is to be sensitive to waveform and type of modulation. Bolometers and hot wire thermocouples measure effective current.

Figure 3:
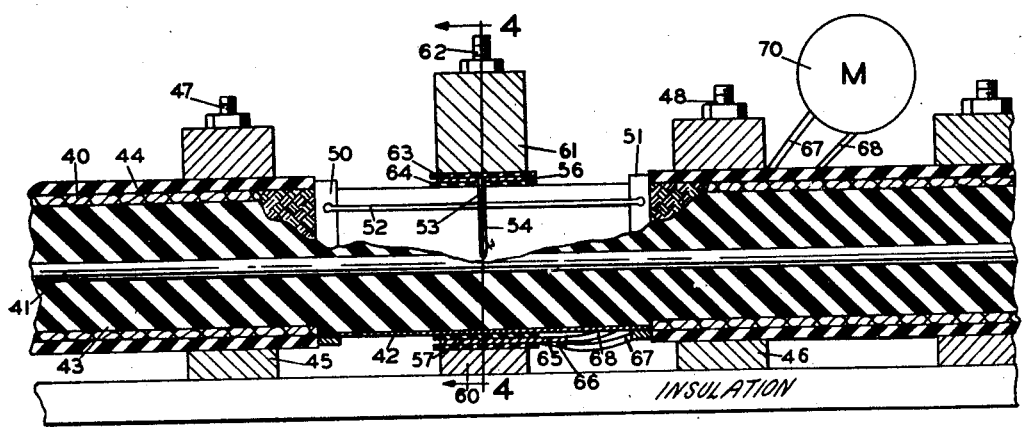
Figure 3 is a fragmentary longitudinal sectional view of a coaxial line assembly and meter that collectively comprise a modification in the device that is shown in Figure 1.
Figure 2:
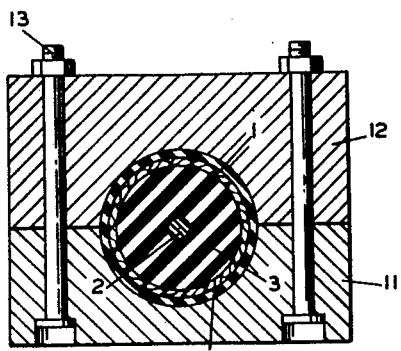
Figure 2 is a section taken along the line 2—2 of Figure 1.
Figure 6:
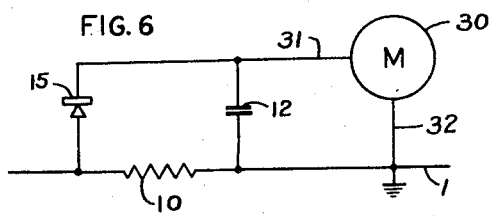
Figure 6 is a schematic wiring diagram of the device illustrated by Figure 1.
Figure 4:
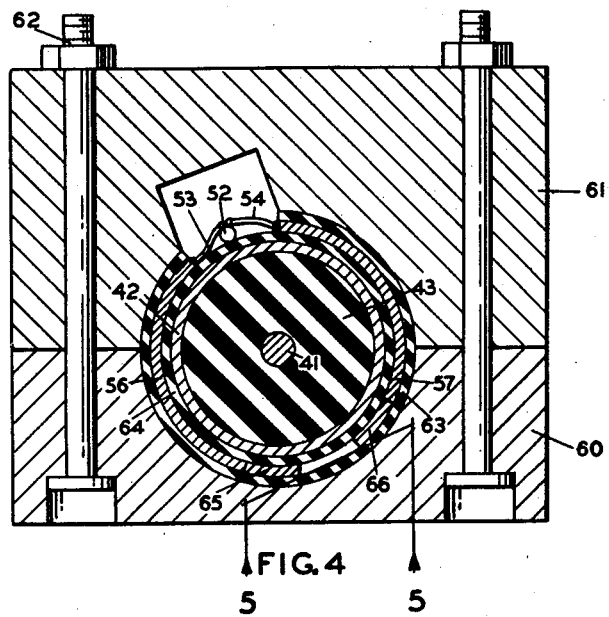
Figure 4 is a section taken along the line 4—4 in Figure 3.
Figure 5:
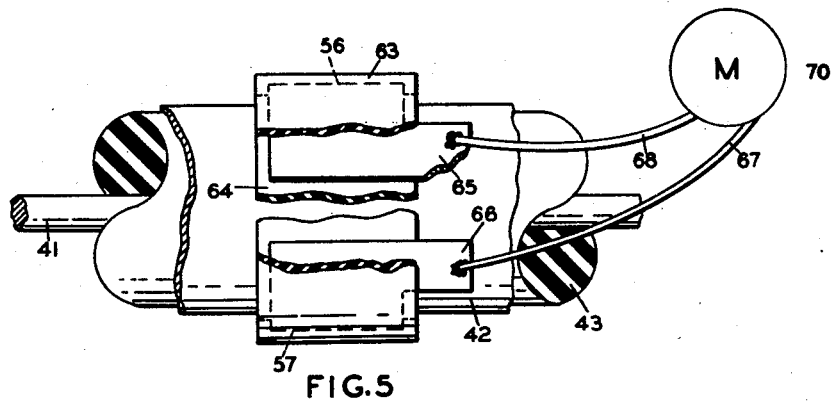
Figure 5 is a fragmentary view taken from substantially the line 5—5 of Figure 4.
Figure 7:
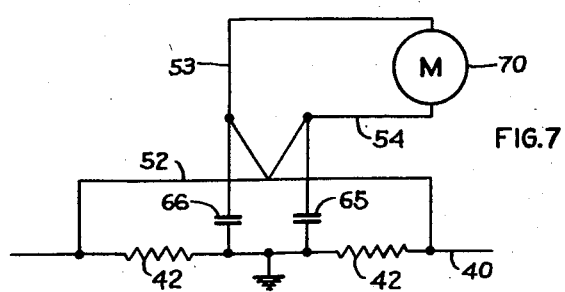
Figure 7 is a schematic wiring diagram of the device illustrated by Figure 3.

A modification in the present invention is illustrated in Figure 3 of the accompanying drawings that is preferred for effective current or power. In this construction the outer conductor 40 of a coaxial cable having an inner conductor 41, is removed along a section thereof and a coating of silver paint 42 is applied directly to the outer surface of the dielectric material 43 that is interposed between the outer conductor 40 and the inner conductor 41 to bridge electrically the ends of the outer conductor 40 adjacent the removed section thereof. The outer conductor 40 is protected in usual manner by an outer sheath 44 of rubber or the like. The coaxial cable is adequately supported in any desired manner, as by clamps 45 and 46 that are secured together by bolts 47 and 48 respectively, or the like.

The cylindrical layer of silver paint 42 has continuous brass rings 50 and 51 at the opposite ends thereof and connected electrically thereto. The brass rings 50 and 51 are initially discontinuous in which condition they are disposed around the outer conductor 40 of the coaxial cable and may be of spring metal clamped upon the outer conductor 40 and under the blocks 45 and 46. When the brass rings 50 and 51 are not of spring metal their ends may be caused to abut each other and be soldered, welded or otherwise secured together. The rings 50 and 51 may, if preferred, be soldered to the coaxial cable outer conductor 40. The silver paint 42 is shunted by a resistance wire 52 of Nichrome or the like, that has its opposite ends soldered to the brass rings 50 and 51 as shown. Thermal variations in the resistance wire 52 are detected by suitable means, such as a pair of thermocouple wires 53 and 54 that have their welded hot junction held in contact with the wire 52 by suitable means, or welded to the wire 52 if preferred.

The thermocouple wires 53 and 54 preferably are of constantan and Nichrome composition and have their two cold junctions individually connected to spaced ends of ring segments 56 and 57 of brass or the like. The brass ring segments 56 and 57 are preferably about .005 inch in thickness and are disposed outwardly of and insulated from the silver paint 42 by mica 64 that preferably is about .002 inch thick and are secured firmly thereagainst by suitable means, such as a cable supporting clamp lower portion 60 and upper portion 61 that are secured together by bolts 62, or the like. The brass ring segments 56 and 57 have their ends spaced from each other and are insulated from the clamp portions 60 and 61 in any desired manner, as by a layer of mica 63 or the like, that is interposed therebetween and that preferably is about .002 inch thick. Another similar layer of mica 64 is interposed between the layer of silver paint 42 and the brass ring segments 56 and 57. Connector tabs 65 and 66 are welded or soldered to the ends of the ring segments 56 and 57, respectively, that are remote from their connections with the thermocouple wires 53 and 54. Connector leads 67 and 68 have one pair of ends soldered to the connector tabs 65 and 66, respectively, and their opposite ends connected to the terminals of a millivoltmeter 70 or the like.

Where the characteristic impedance of the coaxial line is known and the line is terminated in its characteristic impedance, the power flowing to the load may then be determined by substituting the known values in the Equation $P=I^2 Z_0$ wherein P is power measured in watts, $Z_0$ is known characteristic impedance measured in ohms and I is the current in amperes and is measured experimentally.

It is to be understood that the assemblies and the parts thereof that have been shown and described herein have been presented for the purposes of illustrating and describing suitably operative embodiments of the present invention and that similarly functioning modifications and substitutions may be made therein without departing from the scope of the present invention as defined by the appended claims.

What I claim is:

1. A high frequency ammeter and power meter, comprising in combination a substantially coaxial line, an inner conductor part of said line, an outer conductor part of said line and interrupted between the ends thereof, a layer of resistive material connecting the interrupted part of the outer conductor part of said line, a by-pass condenser insulated from said line, a meter, and a direct current rectifier interposed between the outer conductor of said line and said condenser and through said meter to shunt said resistive material.

2. A high frequency ammeter and power meter, comprising in combination a substantially coaxial line, an outer conductor of said line interrupted between the ends thereof, a coating of resistive material bridging the interrupted portion of said outer conductor, a resistance wire bridging the interrupted portion of said outer conductor, a pair of conductive ring segments disposed outwardly of and insulated from the coating of resistive material and from the resistance wire, a thermocouple having its hot junction disposed at said resistance wire and the cold ends of the leads to a pair of spaced ends of the respective ring segments, and a meter having its terminals connected to spaced ends of the ring segments remote from the ends connected to the thermocouple.

3. An electrical measuring instrument of the character described, comprising a pair of concentric conductors for transmitting radio frequency energy of which an inner conductor is shielded by an outer conductor that is interrupted along a part of its length, electrical resistive material bridging the interrupted part of said outer conductor and shielding said inner conductor, a metering circuit connected across said resistive bridge, said metering circuit including an electrical indicating instrument and a radio frequency by-pass capacitive means connected in parallel across said electrical indicating instrument thereby substantially shielding said instrument from the radio frequency energy.

4. An electrical measuring instrument of the character described, comprising a pair of concentric conductors of electrical energy of which an inner conductor is shielded by an outer conductor that is interrupted along a part of its length, electrical resistive material bridging the interrupted part of said outer conductor and shielding said inner conductor, a metering circuit having an electrical indicating instrument as a part thereof and having two terminals connected to the outer conductor in parallel with said resistive material, a radio frequency by-pass capacitive means connected across said electrical indicating instrument a generator of direct voltage responsive to radio frequency current connected in series with said electrical indicating instrument and in parallel with said resistive material.

5. An electrical measuring instrument of the character described, comprising a coaxial cable having an inner conductor and an outer conductor interrupted for a portion of its length, resistive material shielding the cable inner conductor and connecting the outer conductor across its interrupted portion, a heating wire connecting the outer conductor across its interrupted portion, and means for measuring alternating current flow in said cable by thermal contact with said heating wire.

6. An electrical measuring instrument of the character described, comprising a coaxial cable having an inner conductor and an outer conductor interrupted for a portion of its length, resistive material shielding the cable inner conductor and connecting the outer conductor across its interrupted portion, and means connected across said resistive material for measuring alternating current flow in said cable.

HENRY H. GRIMM.

REFERENCES CITED

The following references are of record in the file of this patent:

UNITED STATES PATENTS

| Number | Name | Date |
| --- | --- | --- |
| 2,284,379 | Dow | May 26, 1942 |
| 2,335,486 | Clark | Nov. 30, 1943 |
| 2,106,713 | Bowen | Feb. 1, 1938 |